United States Patent
Yu et al.

(10) Patent No.: US 11,788,888 B2
(45) Date of Patent: Oct. 17, 2023

(54) METHOD AND DEVICE FOR RESTORING AND RECONSTRUCTING A SPECTRUM OF A LIGHT SOURCE BASED ON A HYPERSPECTRAL IMAGE

(71) Applicant: SHENZHEN HYPERNANO OPTICS TECHNOLOGY CO., LTD., Shenzhen (CN)

(72) Inventors: Xingchao Yu, Shenzhen (CN); Zhe Ren, Shenzhen (CN); Bin Guo, Shenzhen (CN); Jinbiao Huang, Shenzhen (CN)

(73) Assignee: SHENZHEN HYPERNANO OPTICS TECHNOLOGY CO., LTD, Shenzhen (CN)

( * ) Notice: Subject to any disclaimer, the term of this patent is extended or adjusted under 35 U.S.C. 154(b) by 158 days.

(21) Appl. No.: 17/608,127

(22) PCT Filed: Sep. 8, 2020

(86) PCT No.: PCT/CN2020/114061
§ 371 (c)(1),
(2) Date: Nov. 1, 2021

(87) PCT Pub. No.: WO2022/051911
PCT Pub. Date: Mar. 17, 2022

(65) Prior Publication Data
US 2022/0326078 A1 Oct. 13, 2022

(51) Int. Cl.
*G01J 3/02* (2006.01)
*G01J 3/28* (2006.01)
*G06T 5/00* (2006.01)

(52) U.S. Cl.
CPC ............. *G01J 3/027* (2013.01); *G01J 3/2823* (2013.01); *G06T 5/003* (2013.01); *G06T 5/007* (2013.01); *G06T 2207/10036* (2013.01)

(58) Field of Classification Search
CPC .. G01J 2003/2826; G01J 3/2823; G01J 3/027; G06T 2207/10036; G06T 5/003
See application file for complete search history.

(56) References Cited

U.S. PATENT DOCUMENTS

| | | | |
|---|---|---|---|
| 7,236,179 B2 | 6/2007 | Ten | |
| 2005/0157939 A1* | 7/2005 | Arsenault | ............... G06T 5/002 382/128 |
| 2020/0074592 A1* | 3/2020 | Vollmerhausen | ........ G09G 5/10 |

FOREIGN PATENT DOCUMENTS

| | | |
|---|---|---|
| CN | 101487738 A | 7/2009 |
| CN | 103148942 A | 6/2013 |

(Continued)

OTHER PUBLICATIONS

Bernd Jahne, "Representation of Multidimensional Signals" 2000, Academic Press (Year: 2000).*

(Continued)

*Primary Examiner* — Maurice C Smith
(74) *Attorney, Agent, or Firm* — Calfee, Halter & Griswold LLP

(57) ABSTRACT

A method and device for restoring and reconstructing a light source spectrum based on a hyperspectral image are provided. A hyperspectral image is processed to obtain a first maximum spectrum. The first maximum spectrum is matched with a light source spectral basis vector set in a light source spectrum dictionary, and a linear decomposition is performed to obtain a dictionary set. The maximum value of each waveband is obtained and iterative approximation is performed. Therefore, it can quickly restore the spectrum of the light source of the shooting environment from a single hyperspectral image using a relatively simple calculation process, and can still achieve a good restoration effect for monochromatic image scenes or image scenes with few colors, even close to the real light source spectrum. After the (Continued)

light source spectrum is obtained, this information can be further utilized for different kinds of applications.

19 Claims, 5 Drawing Sheets

(56) References Cited

FOREIGN PATENT DOCUMENTS

| | | | | | |
|---|---|---|---|---|---|
| CN | 104062010 | A | | 9/2014 | |
| CN | 104502071 | A | | 4/2015 | |
| CN | 104915937 | A | * | 9/2015 | |
| CN | 109360161 | A | * | 2/2019 | ............ G06T 5/003 |
| CN | 109540293 | A | | 3/2019 | |
| EP | 1371957 | A1 | | 12/2003 | |
| WO | 2008064278 | A2 | | 5/2008 | |

OTHER PUBLICATIONS

Karine Avagian, "An FPGA-oriented HW/SW Codesign of Lucy-Richardson Deconvolution Algorithm for Hyperspectral Images", 2019 IEEE (Year: 2019).*

International Search Report of PCT/CN2020/114061 dated Jun. 2, 2021 (10 pages).

Yang et al., "Blind Spectral Unmixing Based on Sparse Nonnegative Matrix Factorization," IEEE Transactions on Image Processing, vol. 20, No. 4, Apr. 2011, pp. 1112.

Lanaras et al., "Hyperspectral Super-Resolution by Coupled Spectral Umnixing," 2015 IEEE International Conference on Computer Vision, pp. 3586-3594.

Search Report from European Application No. 20931710.6 dated Oct. 17, 2022 (9 pages).

\* cited by examiner

METHOD AND DEVICE FOR RESTORING AND RECONSTRUCTING A SPECTRUM OF A LIGHT SOURCE BASED ON A HYPERSPECTRAL IMAGE

CROSS REFERENCE TO RELATED APPLICATIONS

This application is a national application of PCT/CN2020/114061, filed on Sep. 8, 2020, the contents of which are all hereby incorporated by reference.

FIELD

The present application relates to the field of hyperspectral analysis, particularly to a method and device for restoring and reconstructing a spectrum of a light source based on a hyperspectral image.

BACKGROUND

Hyperspectral imaging technology can obtain image information and spectral information simultaneously. It can also perform spectrum-dependent spectral analysis while discriminating objects by combining machine vision technology. Therefore, hyperspectral imaging technology is a new technology with great potential. The spectral analysis ability of hyperspectral imaging technology comes from the fact that a hyperspectral image is able to collect spectral information emitted by a substance at different wavelengths, and the spectral information directly reflect information such as the physical and chemical composition of the object. In combination with image recognition, selection and other information, hyperspectral imaging technology can achieve complete automation flow comprising target detection, composition judgment and result output.

Currently, the common hyperspectral image analysis methods need to acquire the light source spectral information of the photographing environment in advance at the time of extracting the spectral information of a substance, but it is often impossible to read it directly from an image. The reflection on the object being photographed in an image according to its own reflectivity carries light source information, but each color has different light absorptions on different wavebands, which causes that reflected spectra lose energies of partial wavebands at different degrees compared to the original light source. If there are enough different colors, white regions or specular reflection regions in the image, the light source spectrum can be restored through calculations. However, in most cases, these conditions cannot be met or these regions are not easy to find. At that time, it becomes a troublesome issue to obtain the light source spectrum from an image.

For open application scenes of unknown light sources, there are currently some algorithm or methods that can restore the light source spectrum through a hyperspectral photograph, for example, a light source restoration method based on a dichromatic model, or a light source restoration method by a sparse matrix, etc. The limitations of these methods mainly lie in: firstly, they involve a large amount of calculations, require a high calculation power or are time-consuming, and cannot achieve real-time performance; secondly, the application scenes thereof are limited, and these methods cannot accurately restore the original light source spectrum in the case where there are a few types of colors present in an image, and usually require approximate or more than ten types of colors in the image. These two limitations are also the biggest technical problems with which the existing hyperspectral light source restoration is confronted. At present, the prior art still lacks a method of hyperspectral or spectral analysis that adapts to multiple scenes, which method can open up reconstruction or restoration of a light source spectrum under unknown light source scenes in real time and accurately.

In view of this, it is vital to design a method for quickly and accurately restoring and reconstructing a light source spectrum based on a hyperspectral image.

SUMMARY

In view of the problems such as unsatisfactory effects, large limitations, restrictions by application scenes, etc. involved by the methods for obtaining a light source spectrum in the prior art, embodiments of the present application provide a method and device for restoring and reconstructing a light source spectrum based on a hyperspectral image to solve the above-mentioned problems.

In a first aspect, an embodiment of the present application provides a method for restoring and reconstructing a light source spectrum based on a hyperspectral image, comprising the following steps:

S1: obtaining a hyperspectral image, denoted as $I(x, y, \omega)$, where $x$, $y$ and $\omega$ represent a width, a height and a wavelength of the hyperspectral image, respectively, and performing Gaussian convolution processing on the hyperspectral image $I(x, y, \omega)$ to obtain a Gaussian blurred image $B(x, y, \omega)$: $B(x, y, \omega)=I(x, y, \omega)*g(x,y)$, where $g(x,y)$ is a Gaussian convolution kernel matrix;

S2: subtracting the Gaussian blurred image $B(x, y, \omega)$ from the hyperspectral image $I(x, y, \omega)$ to obtain an enhanced image $E(x, y, \omega)$: $E(x, y, \omega)=I(x, y, \omega)-B(x, y, \omega)$;

S3: obtaining a maximum value of each waveband in the enhanced image $E(x, y, \omega)$, and obtaining a first maximum spectrum $R(\omega)$ after visual enhancement: $R(\omega)=\max_{x,y}(E(x, y, \omega))$, where $\max_{x,y}(E(x, y, \omega))$ represents seeking a maximum value of $E(x, y, \omega)$ in x and y dimensions;

S4: performing searching and matching of the first maximum spectrum $R(\omega)$ with a light source spectral basis vector set $D(n, m, \omega)$ in a pre-stored light source spectrum dictionary, and performing linear regression-based decomposition and merging to obtain a potential light source spectral vector set $P(k, \omega)$, where n is a vector sequence number of each basis vector in the light source spectral basis vector set $D(n, m, \omega)$ in the light source spectrum dictionary, m is a group number of interconnected vector group of each basis vector in the light source spectral basis vector set $D(n, m, \omega)$ in the light source spectrum dictionary, which interconnected vector group is composed of interconnected basis vectors, and k is a vector sequence number of each basis vector in the potential light source spectral vector set $P(k, \omega)$ after said matching and merging in the light source spectrum dictionary;

S5: projecting the first maximum spectrum $R(\omega)$ to the potential light source spectral vector set $P(k, \omega)$ to obtain an intensity vector $b(k)$ of each basis vector, and obtaining an initially predicted light source spectrum $L_0(\omega)$ according to the following formula: $L_0(\omega)=P(k, \omega)*b(k)$, taking maximum values of $L_0(\omega)$ and $R(\omega)$ in each waveband to obtain a second maximum spectrum $R'(\omega)$;

S6: replacing the first maximum spectrum $R(\omega)$ with the second maximum spectrum $R'(\omega)$, and repeating step S5 until a color temperature variation value of the second maximum spectrum $R'(\omega)$ is less than a predetermined threshold; and S7: normalizing a newly obtained initially predicted light source spectrum $L_0(\omega)$ to obtain a restored and reconstructed light source spectrum $L(\omega)$.

In some embodiments, a step of establishing the light source spectrum dictionary specifically comprises:

S8: obtaining common light source spectral information, extracting waveform vectors having the same waveband range and waveband interval from the light source spectral information, so as to form a first waveform vector set;

S9: separating and extracting each complete peak and valley information in a waveform of a light source with an unfixed spectrum or color temperature, extracting waveform vectors having the same waveband range and waveband interval from the peak and valley information, so as to form a second waveform vector set; and S10: marking and indexing each waveform vector of the same light source in the first waveform vector set and the second waveform vector set as an interconnected basis vector sequence to form a light source spectrum dictionary, the light source spectrum dictionary being composed of the light source spectral basis vector set $D(n, m, \omega)$.

A basis vector combination scheme with variable dynamic color temperature is adopted during the establishment and use of the light source spectrum dictionary, so that the light source spectrum obtained by calculation has better ductility and adaptability, and is closer to the real light source spectrum.

In some embodiments, in the step S9, a multi-Gaussian peak fitting method is used to separate and extract each complete peak and valley information in a waveform of a light source with an unfixed spectrum or color temperature. This way is efficient and involves a small amount of calculations in extracting each complete peak and valley information.

In some embodiments, the step S4 specifically comprises:

S41: performing linear regression of the first maximum spectrum $R(\omega)$ on the light source spectral basis vector set $D(n, m, \omega)$ in the light source spectrum dictionary, and combinating and forming a new light source spectral basis vector set $D'(k', m', \omega)$ according to a correlation, where k' is a vector sequence number of the new light source spectral basis vector set $D'(k', m', \omega)$ in the light source spectral dictionary, m' is a group number of an interconnected vector group of the new light source spectral basis vector set $D'(k', m', \omega)$ in the light source spectrum dictionary;

S42: merging all other basis vectors having the same group number as m' in the light source spectrum dictionary into the new light source spectral basis vector set $D'(k', m', \omega)$ to obtain the potential light source spectral vector set $P(k, \omega)$, where k is a vector sequence number of each basis vector in the potential light source spectral vector set $P(k, \omega)$ in the light source spectrum dictionary.

Matching searching is performed for the first maximum spectrum directly obtained from a hyperspectral image in the light source spectrum dictionary using this method of establishing a light source spectrum dictionary, so as to obtain a more accurate spectrum or a spectrum closer to the real light source spectrum.

In some embodiments, basis vectors that are arranged from high to low in order of correlation and taken from the top of the new light source spectral basis vector set $D'(k', m', \omega)$ contain no more than two or three light source components. In this case, the calculation is convenient and the efficiency of calculation can be increased.

In some embodiments, the linear regression-based decomposition comprises least square linear regression-based decomposition. The most correlated light source spectral basis vector is obtained by least square linear regression-based decomposition.

In some embodiments, a formula of a two-dimensional Gaussian kernel used by the Gaussian convolution processing is:

$$g(x,y) = \frac{1}{2\pi\sigma^2} e^{\frac{-(x^2+y^2)}{2\sigma^2}}$$

where $\sigma$ is a standard deviation of a Gaussian function.

A blurred hyperspectral image is obtained by Gaussian convolution processing, and then the Gaussian blurred image is subtracted from the original image to obtain an enhanced image, so that the processed image is more approximate to the perception of a human eye.

In some embodiments, the $g(x,y)$ is replaced by an i×i digital matrix. At that time, the calculation is more convenient during actual applications.

In some embodiments, a color temperature variation value $\Delta T_c$ of the second maximum spectrum $R'(\omega)$ is calculated according to the following formula: $\Delta T_c = |T_c(L_0) - T_c(R')|$, where $T_c(L_0)$ is a color temperature to which the initially predicted light source spectrum $L_0(\omega)$ corresponds, $T_c(R')$ is a color temperature of the second maximum spectrum $R'(\omega)$. Iterative approximation is performed through the second maximum spectrum, which can make up the problem of loss of spectral waveforms in some wavebands due to lack of color types, such that this method is more robust and no longer depends on the number of color types in the imaging field range.

In a second aspect, an embodiment of the present application further proposes a device for restoring and reconstructing a light source spectrum based on a hyperspectral image, comprising:

an image blurring module for obtaining a hyperspectral image, denoted as $I(x, y, \omega)$, where x, y and $\omega$ represent a width, a height and a wavelength of the hyperspectral image, respectively, and performing Gaussian convolution processing on the hyperspectral image $I(x, y, \omega)$ to obtain a Gaussian blurred image $B(x, y, \omega)$: $B(x, y, \omega) = I(x, y, \omega) * g(x,y)$, where $g(x,y)$ is a Gaussian convolution kernel matrix;

an image enhancement module for subtracting the Gaussian blurred image $B(x, y, \omega)$ from the hyperspectral image $I(x, y, \omega)$ to obtain an enhanced image $E(x, y, \omega)$: $E(x, y, \omega) = I(x, y, \omega) - B(x, y, \omega)$;

a first maximum spectrum acquisition module for obtaining a maximum value of each waveband in the enhanced image $E(x, y, \omega)$ to obtain a first maximum spectrum $R(\omega)$ after visual enhancement: $R(\omega) = \max_{x,y}(E(x, y, \omega))$, where $\max_{x,y}(E(x, y, \omega))$ represents seeking a maximum value of $E(x, y, \omega)$ in x and y dimensions;

a spectrum matching module for performing searching and matching of the first maximum spectrum $R(\omega)$ with a light source spectral basis vector set $D(n, m, \omega)$ in a pre-stored light source spectrum dictionary, and performing linear regression-based decomposition and merging to obtain a potential light source spectral vector set $P(k, \omega)$, where n is a vector sequence number of each basis vector in the light source spectral basis vector set $D(n, m, \omega)$ in the light source spectrum dictionary, m is a group number of interconnected vector group of each basis vector in the light source spectral basis vector set $D(n, m, \omega)$ in the light source spectrum dictionary, which interconnected vector group is composed of interconnected basis vectors and k is a vector sequence number of each basis vector in the potential light source spectral vector set $P(k, \omega)$ after said matching and merging in the light source spectrum dictionary;

a light source spectrum initial prediction module for projecting the first maximum spectrum $R(\omega)$ to the potential light source spectral vector set $P(k, \omega)$ to obtain an intensity vector $b(k)$ of each basis vector, and obtaining an initially predicted light source spectrum $L_0(\omega)$ according to the following formula: $L_0(\omega)=P(k, \omega)*b(k)$, taking maximum values of $L_0(\omega)$ and $R(\omega)$ in each waveband to obtain a maximum spectrum $R'(\omega)$;

a spectrum iteration module for replacing the first maximum spectrum $R(\omega)$ with the second maximum spectrum $R'(\omega)$, and repeatedly executing the light source spectrum initial prediction module until a color temperature variation value of the second maximum spectrum $R'(\omega)$ is less than a predetermined threshold; and a normalization module for normalizing a newly obtained initially predicted light source spectrum $L_0(\omega)$ to obtain a restored and reconstructed light source spectrum $L(\omega)$.

In a third aspect, an embodiment of the present application provides a computer readable storage medium with a computer program stored thereon, the method described in any of the foregoing embodiments in the first aspect is carried out when the program is executed by a processor.

The present application discloses a method and device for restoring and reconstructing a light source spectrum based on a hyperspectral image, which can quickly and accurately restore the spectrum of the light source of the shooting environment from a single hyperspectral image using a relatively simple calculation process, and can still achieve a good restoration effect for monochromatic image scenes or image scenes with few colors, even close to the real light source spectrum. After the light source spectrum is obtained, this information can be further utilized for different kinds of applications, for example, extracting and analyzing the reflection spectrum and absorption spectrum of a substance, and further analyzing the composition of the substance. In the case where there is no need to obtain the light source spectral information in advance or measure the light source using additional apparatuses and components, it reduces data collection time, improves analysis efficiency, greatly extends the applicable scenes of hyperspectral imaging, and increases the flexibility and possibility of application.

BRIEF DESCRIPTION OF THE DRAWINGS

The drawings are included to provide a further understanding of embodiments, and the drawings are incorporated into this specification and constitute a part of this specification. The drawings illustrate the embodiments and together with the description serve to explain the principles of the present application. It will be easy to recognize other embodiments and many expected advantages of the embodiments because they become better understood by referring to the detailed description below. The elements in the drawings are not necessarily in proportion to each other. The same reference numerals denote corresponding similar components.

DETAILED DESCRIPTION

In order to make the objectives, technical solutions and advantages of the present application clearer, the present application will be further described in detail below in conjunction with the accompanying drawings. Obviously, the described embodiments are only a part of the embodiments of the present application, rather than all of them. All other embodiments obtained by a person having an ordinary skill in the art based on the embodiments in the present application without spending inventive efforts shall fall within the protection scope of the present application.

Figure 1:
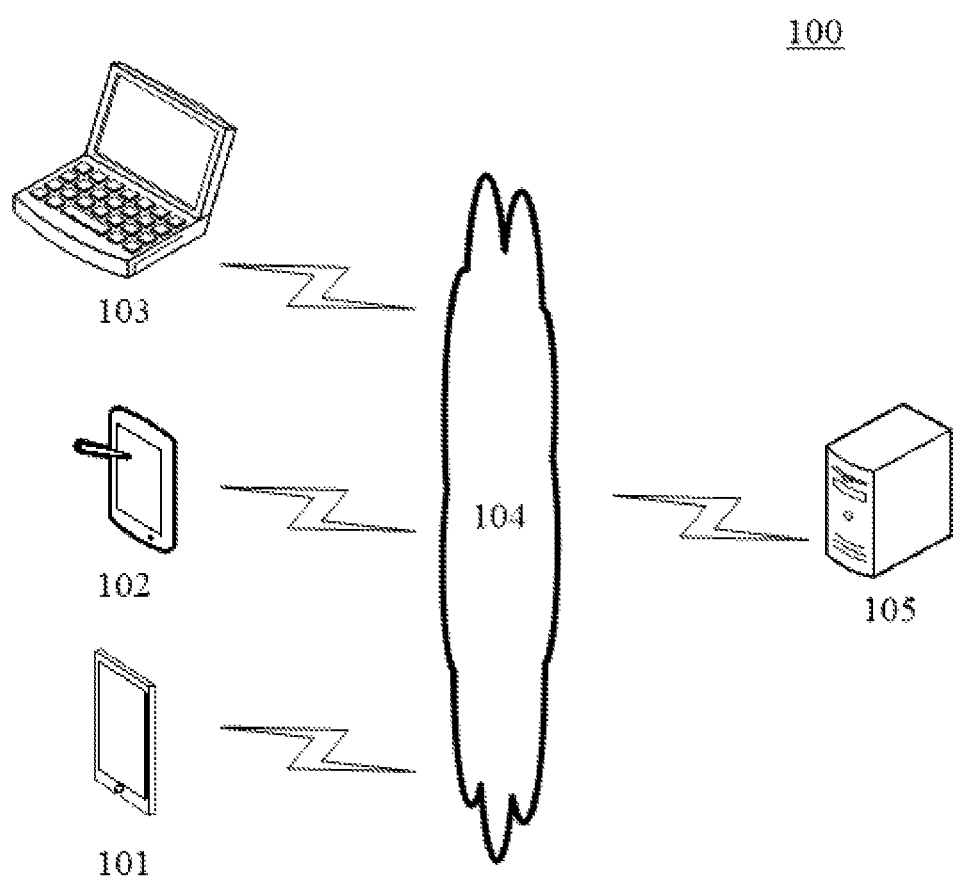
FIG. 1 is an architecture diagram of an exemplary device to which an embodiment of the present application can be applied.

FIG. 1 illustrates an exemplary device architecture 100 that can apply a method for restoring and reconstructing a light source spectrum based on a hyperspectral image or a device for restoring and reconstructing a light source spectrum based on a hyperspectral image according to an embodiment of the present application.

As shown in FIG. 1, the device architecture 100 may comprise terminal devices 101, 102, 103, a network 104, and a server 105. The network 104 is used to provide a medium for communication links between the terminal devices 101, 102, 103 and the server 105. The network 104 may include various connection types, such as wired, wireless communication links, or fiber optic cables, and so on.

The user may use the terminal devices 101, 102, 103 to interact with the server 105 through the network 104 so as to receive or send messages, and so on. Various applications may be installed on the terminal devices 101, 102, 103, such as data processing applications, file processing applications, and the like.

The terminal devices 101, 102, 103 may be hardware or software. When the terminal devices 101, 102, 103 are hardware, they may be various electronic devices, including but not limited to smart phones, tablet computers, laptop computers, desktop computers, and so on. When the terminal devices 101, 102, 103 are software, they may be installed in the electronic devices listed above. They may be implemented as multiple software or software modules (for example, software or software modules used to provide distributed services), or as a single software or software module, which are not specifically defined here.

The server 105 may be a server that provides various services, such as a background data processing server that processes files or data uploaded by the terminal devices 101, 102, 103. The background data processing server is capable of processing the acquired files or data and generating processing results.

It is to be noted that the method for restoring and reconstructing a light source spectrum based on a hyperspectral image provided by an embodiment of the present application may be executed by the server 105, and may also be executed by the terminal devices 101, 102, 103. Accordingly, the device for restoring and reconstructing a light source spectrum based on a hyperspectral image may be disposed in the server 105, and may also be disposed in the terminal devices 101, 102, 103.

It should be understood that the numbers of terminal devices, networks and servers in FIG. 1 are merely illustrative. According to implementation needs, there may be any number of terminal devices, networks and servers. In the case that the data to be processed does not need to be acquired remotely, the above-described device architecture may not include a network, but only needs a server or terminal device.

Figure 2:
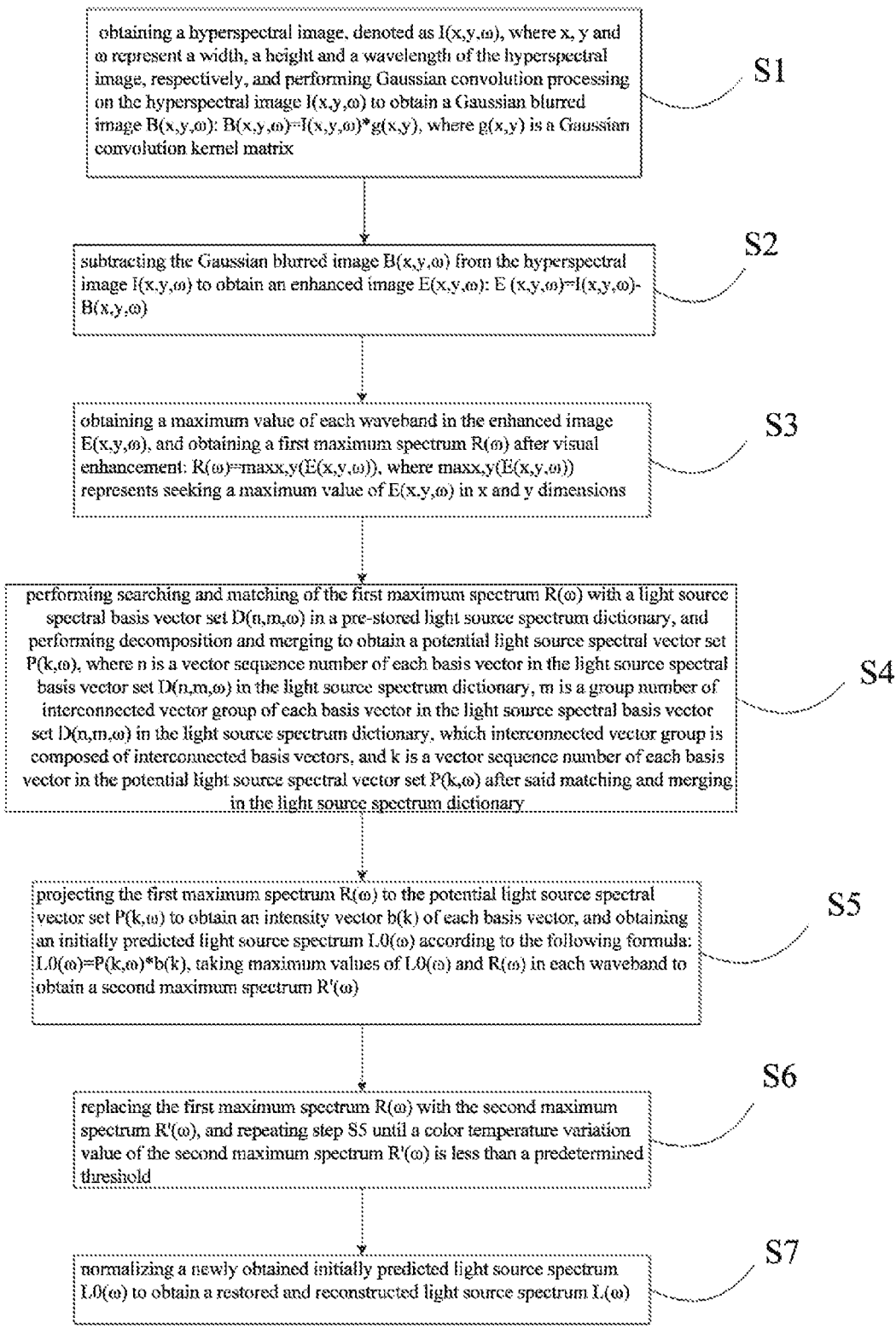
FIG. 2 is a flow chart of a method for restoring and reconstructing a light source spectrum based on a hyperspectral image in an embodiment of the present application.

As shown in FIG. 2, an embodiment of the present application provides a method for restoring and reconstructing a light source spectrum based on a hyperspectral image, which comprises the following steps:

S1: obtaining a hyperspectral image, denoted as $I(x, y, \omega)$, where x, y and $\omega$ represent a width, a height and a wavelength of the hyperspectral image, respectively, and performing Gaussian convolution processing on the hyperspectral image $I(x, y, \omega)$ to obtain a Gaussian blurred image $B(x, y, \omega)$: $B(x, y, \omega)=I(x, y, \omega)*g(x,y)$, where $g(x,y)$ is a Gaussian convolution kernel matrix;

S2: subtracting the Gaussian blurred image $B(x, y, \omega)$ from the hyperspectral image $I(x, y, \omega)$ to obtain an enhanced image $E(x, y, \omega)$: $E(x, y, \omega)=I(x, y, \omega)-B(x, y, \omega)$;

S3: obtaining a maximum value of each waveband in the enhanced image $E(x, y, \omega)$, and obtaining a first maximum spectrum $R(\omega)$ after visual enhancement: $R(\omega)=\max_{x,y}(E(x, y, \omega))$, where $\max_{x,y}(E(x, y, \omega))$ represents seeking a maximum value of $E(x, y, \omega)$ in x and y dimensions;

S4: performing searching and matching of the first maximum spectrum $R(\omega)$ with a light source spectral basis vector set $D(n, m, \omega)$ in a pre-stored light source spectrum dictionary, and performing linear regression-based decomposition and merging to obtain a potential light source spectral vector set $P(k, \omega)$, where n is a vector sequence number of each basis vector in the light source spectral basis vector set $D(n, m, \omega)$ in the light source spectrum dictionary, m is a group number of interconnected vector group for each basis vector in the light source spectral basis vector set $D(n, m, \omega)$ in the light source spectrum dictionary, which interconnected vector group is composed of interconnected basis vectors, and k is a vector sequence number of each basis vector in the potential light source spectral vector set $P(k, \omega)$ after said matching and merging in the light source spectrum dictionary;

S5: projecting the first maximum spectrum $R(\omega)$ to the potential light source spectral vector set $P(k, \omega)$ to obtain an intensity vector $b(k)$ of each basis vector, and obtaining an initially predicted light source spectrum $L_0(\omega)$ according to the following formula: $L_0(\omega)=P(k, \omega)*b(k)$, taking maximum values of $L_0(\omega)$ and $R(\omega)$ in each waveband to obtain a second maximum spectrum $R'(\omega)$;

S6: replacing the first maximum spectrum $R(\omega)$ with the second maximum spectrum $R'(\omega)$, and repeating step S5 until a color temperature variation value of the second maximum spectrum $R'(\omega)$ is less than a predetermined threshold; and S7: normalizing a newly obtained initially predicted light source spectrum $L_0(\omega)$ to obtain a restored and reconstructed light source spectrum $L(\omega)$.

Figure 3:
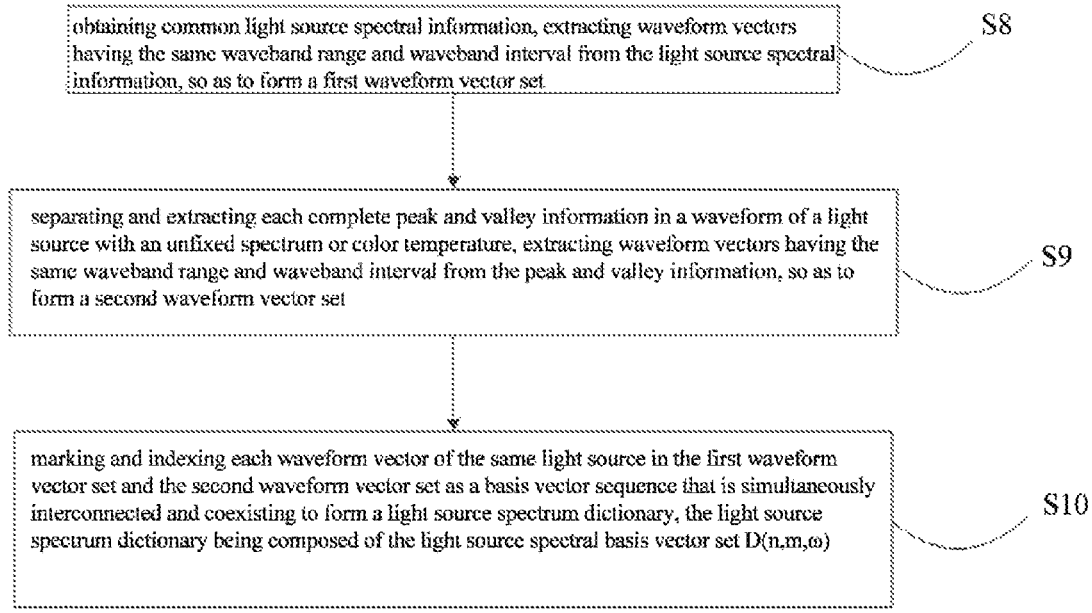
FIG. 3 is a flow chart illustrating steps of establishing a light source spectrum dictionary in a method for restoring and reconstructing a light source spectrum based on a hyperspectral image in an embodiment of the present application.

In a specific embodiment, as shown in FIG. 3, the step of establishing a light source spectrum dictionary specifically comprises:

S8: obtaining common light source spectral information, extracting waveform vectors having the same waveband range and waveband interval from the light source spectral information, and forming a first waveform vector set;

S9: separating and extracting each complete peak and valley information in a waveform of a light source with an unfixed spectrum or color temperature extracting waveform vectors having the same waveband range and waveband interval from the peak and valley information, and forming a second waveform vector set; and S10: marking each waveform vector of the same light source in the first waveform vector set and the second waveform vector set as an interconnected basis vector sequence, and establishing an index to form a light source spectrum dictionary, the light source spectrum dictionary being composed of the light source spectral basis vector set $D(n, m, \omega)$.

The common classic light sources acquired in step S8 include daylight with different color temperatures, black body radiation curves or incandescent lamps, different classic fluorescent lamp spectral sequences F2 to F12, and currently more general LED light sources. For some artificial light sources with an unfixed spectrum or color temperature, such as LEDs, there will be a change in intensity between the luminescences of an excitation chip and a phosphor, which results in a drift in the color temperature and the spectrum. Therefore, in a specific embodiment, in step S9, a multi-Gaussian peak fitting method is used to separate and extract each complete peak and valley information in the waveform of a light source with an unfixed spectrum or color temperature. Each complete peak and valley information is processed as an individual basis vector, and the waveform vectors having the same waveband range and waveband interval are extracted to form a second wave vector set, which is added to the light source spectrum dictionary. A basis vector combination scheme with variable dynamic color temperature is adopted during the establishment and use of the light source spectrum dictionary, so that the light source spectrum obtained by calculation has better ductility and adaptability, and is closer to the real light source spectrum. Furthermore, each waveform vector separated from the same light source is marked as a basis vector sequence that needs to be interconnected and coexist simultaneously. That is to say, if there is a matching related to one of the waveforms in the group of basic sequence during searching and matching of the algorithm for restoring a light source spectrum, other waveforms in the same group of sequences are automatically added as potential light source spectrum matching basis vectors. If a new light source spectrum that is not present in the light source spectrum dictionary is found, steps S8-S10 are repeated to add the new light source spectral information to the light source spectrum dictionary, and create an index, including an index of each vector and an index of each group of interconnected vector sequence. In other optional embodiments, other methods may also be used to establish the light source spectrum dictionary. After a relatively complete light source spectrum dictionary is established, the light source spectrum of the captured hyperspectral image can be restored by implementing steps S1-S7.

In a specific embodiment, the formula of a two-dimensional Gaussian kernel used by the Gaussian convolution processing in step S1 is:

$$g(x, y) = \frac{1}{2\pi\sigma^2} e^{-(x^2+y^2)/2\sigma^2}$$

wherein σ is a standard deviation of the Gaussian function, which can represent the degree of smoothness; g(x,y) is replaced by an i×i digital matrix. In a preferred embodiment, g(x,y) is a matrix with a size of 9*9, and σ is 3 pixels. A blurred hyperspectral image is obtained by Gaussian convolution processing, and then the Gaussian blurred image is subtracted from the original image to obtain an enhanced image.

In step S3, a maximum value of each waveband in the enhanced image E(x, y, ω) is obtained to obtain a first maximum spectrum R(ω). The first maximum spectrum R(ω) is theoretically partly approximate to the light source spectrum. However, since there are changes in the intensity of light and the distance of the object, and the surfaces of different objects reflect and absorb light of different wavelengths differently, the shape of the first maximum spectrum R(ω) will change. Compared to the light source spectrum, there will also be loss or depression in some waveband waveform. The fewer the colors are present in a captured image, the more serious the loss will be. Therefore, step S4 is used to compensate for such loss.

Figure 4:
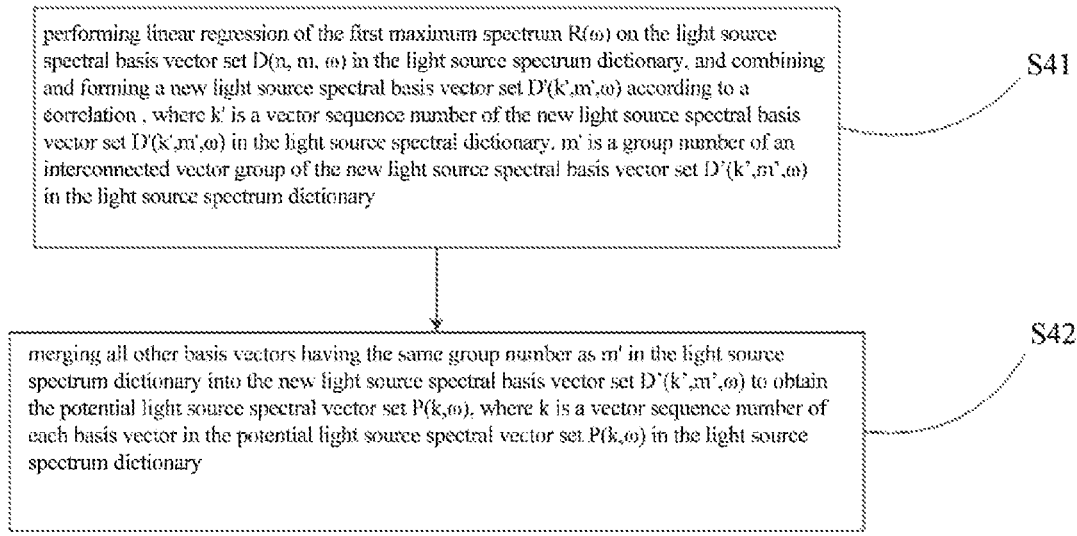
FIG. 4 is a flow chart illustrating step S4 of a method for restoring and reconstructing a light source spectrum based on a hyperspectral image in an embodiment of the present application.

There are many ways to match the obtained first maximum spectrum R(ω) with the light source spectrum dictionary. A method specifically adopted in this embodiment will be set forth below in detail. In a specific embodiment, as shown in FIG. 4, step S4 specifically comprises:

S41: performing linear regression of the first maximum spectrum R(ω) on the light source spectral basis vector set D(n, m, ω) in the light source spectrum dictionary, and combinating and forming a new light source spectral basis vector set D'(k', m', ω) according to a correlation, where k' is a vector sequence number of the new light source spectral basis vector set D'(k', m', ω) in the light source spectral dictionary, m' is a group number of interconnected vector group of the new light source spectral basis vector set D'(k', m', ω) in the light source spectrum dictionary;

S42: merging all other basis vectors having the same group number as m' in the light source spectrum dictionary into the new light source spectral basis vector set D'(k', m', ω) to obtain the potential light source spectral vector set P(k, ω), where k is a vector sequence number of each basis vector in the potential light source spectral vector set P(k, ω) in the light source spectrum dictionary.

In a specific embodiment, basis vectors that are arranged from high to low in order of correlation and taken from the top of the most correlated light source spectral basis vector set D'(k', m', ω) contain no more than two or three light source components, because this assumption can be valid in most natural or artificial light source scenes. The linear regression-based decomposition in step S41 includes least square linear regression-based decomposition. After calculation by the least square linear regression-based decomposition, the first three most correlated light source spectral basis vector sets D'(k', m', ω) are taken. After obtaining k' and m', all other basis vectors (that is, not the first three most correlated ones) in the same group as m' are added to the potential light source basis vector set to obtain a new potential light source spectral vector set P(k, ω), where k is a sequence number of the potential light source spectral vector set P(k, ω) in the light source spectrum dictionary established in advance.

In a specific embodiment, the color temperature variation value $\Delta T_c$ of the second maximum spectrum R'(ω) in step S6 is calculated according to the following formula: $\Delta T_c = |T_c(L_0) - T_c(R')|$, where $T_c(L_0)$ is a color temperature to which the initial predicted light source spectrum $L_0(\omega)$ corresponds, and $T_c(R')$ is a color temperature of the second maximum spectrum R'(ω). Iterative approximation is performed through the second maximum spectrum. In a preferred embodiment, the predetermined threshold of the color temperature of the second maximum spectrum R'(ω) is 1. That is, in the case of $\Delta T_c < 1$, the color temperature of the second maximum spectrum R'(ω) no longer changes. This method can make up the problem of loss of spectral waveforms in some wavebands due to lack of color types, such that this method is more robust and no longer depends on the number of color types in the imaging field range.

Figure 5:
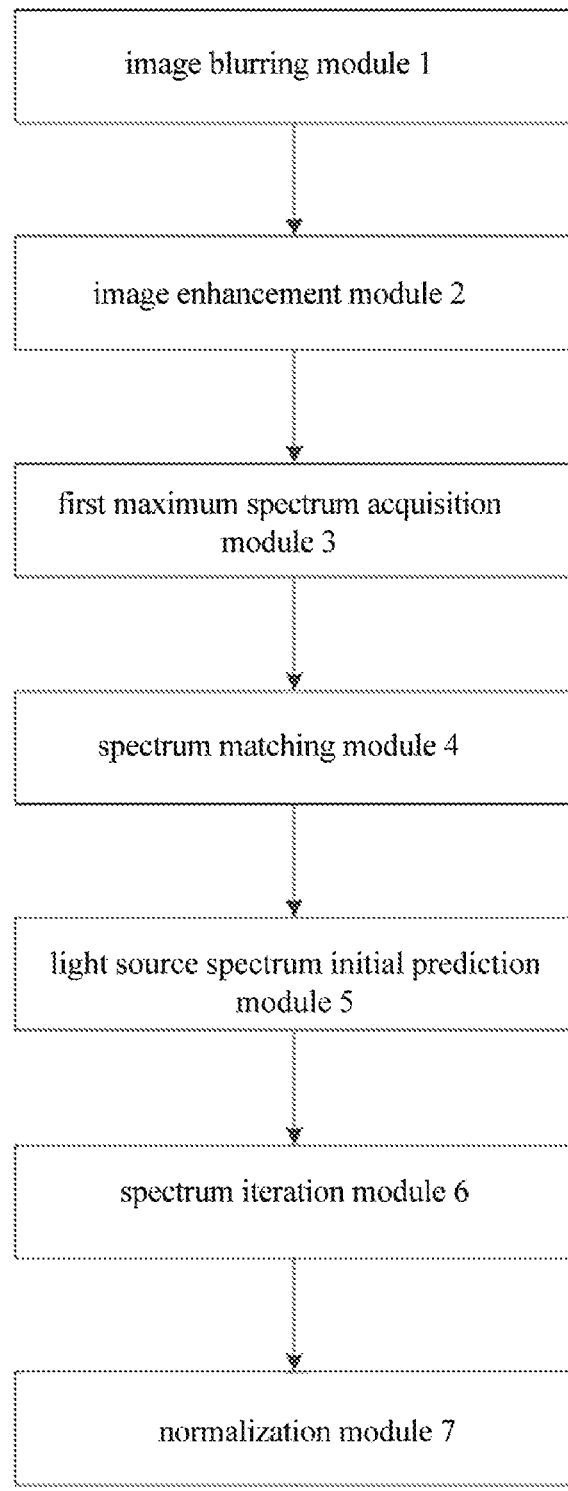
FIG. 5 is a schematic view of a device for restoring and reconstructing a light source spectrum based on a hyperspectral image in an embodiment of the present application.

Further referring to FIG. 5, as an implementation of the methods shown in the above figures, the present application provides an embodiment of a device for restoring and reconstructing a light source spectrum based on a hyperspectral image. This device embodiment is corresponding to the method embodiment shown in FIG. 2, and the device may be specifically applied to various electronic devices.

As shown in FIG. 5, an embodiment of the present application further proposes a device for restoring and reconstructing a light source spectrum based on a hyperspectral image, comprising:

an image blurring module 1 for obtaining a hyperspectral image, denoted as I(x, y, ω), where x, y and ω represent a width, a height and a wavelength of the hyperspectral image, respectively, and performing Gaussian convolution processing on the hyperspectral image I(x, y, ω) to obtain a Gaussian blurred image B(x, y, ω): B(x, y, ω)=I(x, y, ω)*g(x,y), where g(x,y) is a Gaussian convolution kernel matrix;

an image enhancement module 2 for subtracting the Gaussian blurred image B(x, y, ω) from the hyperspectral image I(x, y, ω) to obtain an enhanced image E(x, y, ω): E(x, y, ω)=I(x, y, ω)−B(x, y, ω);

a first maximum spectrum acquisition module 3 for obtaining a maximum value of each waveband in the enhanced image E(x, y, ω) to obtain a first maximum spectrum R(ω) after visual enhancement: R(ω)=max$_{x,y}$(E(x, y, ω)), where max$_{x,y}$(E(x, y, ω)) represents seeking a maximum value of E(x, y, ω) in x and y dimensions;

a spectrum matching module 4 for performing searching and matching of the first maximum spectrum R(ω) with a light source spectral basis vector set D(n, m, ω) in a pre-stored light source spectrum dictionary, and performing linear regression-based decomposition and merging to obtain a potential light source spectral vector set P(k, ω), where n is a vector sequence number of each basis vector in the light source spectral basis vector set D(n, m, ω) in the light source spectrum dictionary, m is a group number of interconnected vector group of each basis vector in the light source spectral basis vector set D(n, m, ω) in the light source spectrum dictionary, which interconnected vector group is composed of interconnected basis vectors, and k is a vector sequence number of each basis vector in the potential light source spectral vector set P(k, ω) after said matching and merging in the light source spectrum dictionary;

a light source spectrum initial prediction module 5 for projecting the first maximum spectrum R(ω) to the potential light source spectral vector set P(k, ω) to obtain an intensity vector b(k) of each basis vector, and obtaining an initially predicted light source spectrum $L_0(\omega)$ according to the following formula: $L_0(\omega)=P(k, \omega)*b(k)$, taking maximum values of $L_0(\omega)$ and R(ω) in each waveband to obtain a maximum spectrum R'(ω);

a spectrum iteration module 6 for replacing the first maximum spectrum R(ω) with the second maximum spectrum R'(ω), and repeatedly executing the light source spectrum initial prediction module until a color temperature variation value of the second maximum spectrum R'(ω) is less than a predetermined threshold; and a normalization module 7 for normalizing a newly obtained initially predicted light source spectrum $L_0(ω)$ to obtain a restored and reconstructed light source spectrum $L(ω)$.

In a specific embodiment, a device for establishing a light source spectrum dictionary specifically comprises:

a light source spectral information acquisition module for obtaining common light source spectral information, extracting waveform vectors having the same waveband range and waveband interval from the light source spectral information, and forming a first waveform vector set;

a peak and valley information extraction module for separating and extracting each complete peak and valley information in a waveform of a light source with an unfixed spectrum or color temperature, extracting waveform vectors having the same waveband range and waveband interval from the peak and valley information, and forming a second waveform vector set; and a dictionary establishment module marking each waveform vector of the same light source in the first waveform vector set and the second waveform vector set as an interconnected basis vector sequence, and establishing an index to form a light source spectrum dictionary, the light source spectrum dictionary being composed of the light source spectral basis vector set D(n, m, ω).

In a specific embodiment, the formula of the two-dimensional Gaussian kernel used by the Gaussian convolution processing in the image blurring module 1 is:

$$g(x, y) = \frac{1}{2\pi\sigma^2} e^{-(x^2+y^2)/2\sigma^2}$$

wherein σ is a standard deviation of the Gaussian function, which is used to adjust the degree of smoothness; g(x,y) is replaced by an i×i digital matrix. In a preferred embodiment, g(x,y) is a matrix with a size of 9*9, and σ is 3 pixels. A blurred hyperspectral image is obtained by Gaussian convolution processing, and then the Gaussian blurred image is subtracted from the original image to obtain an enhanced image.

A maximum value of each waveband in the enhanced image E(x, y, ω) is obtained in the first maximum spectrum acquisition module 3 to obtain the first maximum spectrum R(ω). The first maximum spectrum R(ω) is theoretically partly close to the light source spectrum. However, since there are changes in the intensity of light and the distance of the object, and the surfaces of different objects reflect and absorb light of different wavelengths differently, the shape of the first maximum spectrum R(ω) will change. Compared to the light source spectrum, there will also be loss of depressions in the waveband waveform. The fewer the colors are present in a captured image, the more serious the loss will be. Therefore, the spectrum matching module 4 is used to compensate for such loss.

There are many ways to match the obtained first maximum spectrum R(ω) with the light source spectrum dictionary. A method specifically adopted in this embodiment will be set forth below in detail. In a specific embodiment, the spectrum matching module 4 specifically comprises:

a linear regression-based decomposition module for performing linear regression of the first maximum spectrum R(ω) on the light source spectral basis vector set D(n, m, ω) in the light source spectrum dictionary, and combinating and forming a new light source spectral basis vector set D'(k', m', ω) according to a correlation, where k' is a vector sequence number of the new light source spectral basis vector set D'(k', m', ω) in the light source spectral dictionary, and m' is a group number of an interconnected vector group of the new light source spectral basis vector set D'(k', m', ω) in the light source spectrum dictionary;

a dictionary set acquisition module for merging all other basis vectors having the same group number as m' in the light source spectrum dictionary into the new light source spectral basis vector set D'(k', m', ω) to obtain the potential light source spectral vector set P(k, ω), where k is a vector sequence number of each basis vector in the potential light source spectral vector set P(k, ω) in the light source spectrum dictionary.

In a specific embodiment, basis vectors that are arranged from high to low in order of correlation and taken from the top of the most correlated light source spectral basis vector set D'(k', m', ω) contain no more than two or three light source components, because this assumption can be valid in most natural or artificial light source scenes. The linear regression-based decomposition in the linear regression-based decomposition module includes least square linear decomposition. After calculation by the least square linear decomposition, the first three most correlated light source spectral basis vector sets D'(k', m', ω) are taken. After obtaining the first three most correlated k' and m', all other basis vectors in the same group as m' are merged into the taken light source spectral basis vector sets D'(k', m', ω) to obtain a potential light source spectral vector set P(k, ω), where k is a basis vector sequence number of the potential light source spectral vector set P(k, ω) in the light source spectrum dictionary.

In a specific embodiment, the color temperature variation value $\Delta T_c$ of the second maximum spectrum R'(ω) in the spectrum iteration module 6 is calculated according to the following formula: $\Delta T_c = |T_c(L_0) - T_c(R')|$, where $T_c(L_0)$ is a color temperature to which the initial predicted light source spectrum $L_0(ω)$ corresponds, and $T_c(R')$ is a color temperature of the second maximum spectrum R'(ω). Iterative approximation is performed through the second maximum spectrum. In a preferred embodiment, the predetermined threshold of the color temperature of the second maximum spectrum R'(ω) is 1. That is, in case of $\Delta t_c < 1$, the color temperature of the second maximum spectrum R'(ω) no longer changes. This method can make up the problem of loss of spectral waveforms in some wavebands due to lack of color types, such that this method is more robust and no longer depends on the number of color types in the imaging field range.

The present application discloses a method and device for restoring and reconstructing a light source spectrum based on a hyperspectral image, which can quickly and accurately restore the spectrum of the light source of the photographing environment from a single hyperspectral image using a relatively simple calculation process, and can still achieve a good restoration effect for monochromatic image scenes or image scenes with few colors, even approximate to the real light source spectrum. After the light source spectrum is obtained, this information can be further utilized for different kinds of applications, for example, extracting and analyzing the reflection spectrum and absorption spectrum of a substance, for further analyzing the composition of the substance. It reduces data collection time, improves analysis efficiency, greatly extends the applicable scenes of hyperspectral imaging, and increases the flexibility and possibility of application. At the same time, there is no need to obtain the light source spectral information in advance or measure the light source using additional apparatuses and components.

Figure 6:
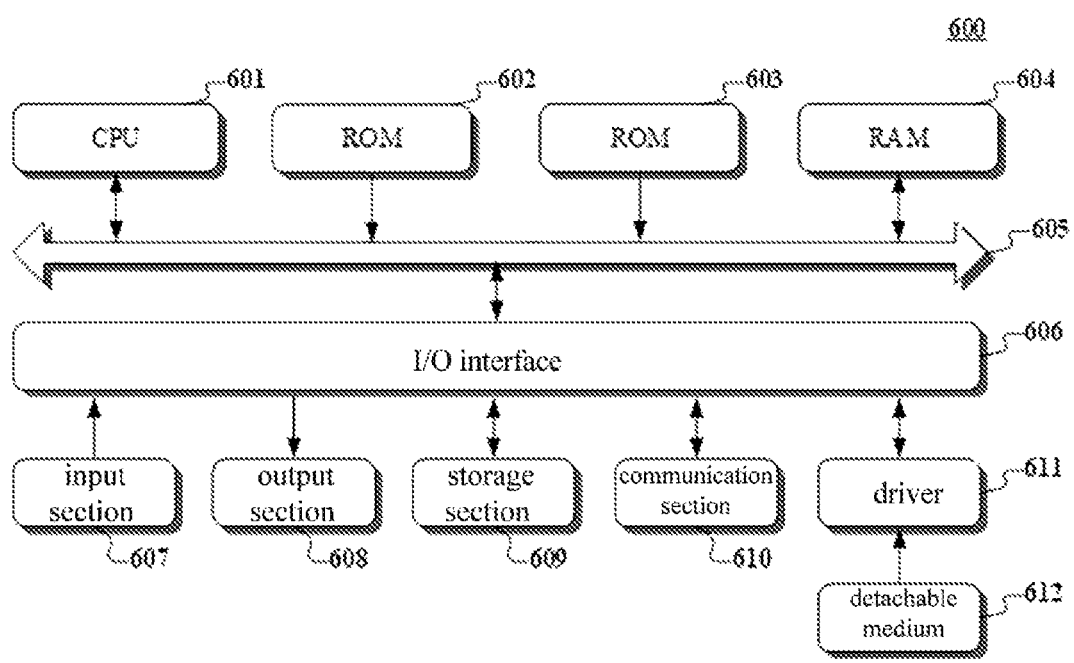
FIG. 6 is a schematic structural view of a computer apparatus adapted to implement an electronic device according to an embodiment of the present application.

Reference is now made to FIG. 6, which shows a schematic structural view of a computer apparatus 600 adapted to implement an electronic device (such as the server or terminal device shown in FIG. 1) according to an embodiment of the present application. The electronic device shown in FIG. 6 is only an example, and should not bring any limitation to the function and application range of the embodiments of the present application.

As shown in FIG. 6, the computer apparatus 600 comprises a central processing unit (CPU) 601 and a graphics processing unit (GPU) 602, which can execute various appropriate actions and processings according to programs stored in a read-only memory (ROM) 603 or programs loaded from a storage section 609 to a random access memory (RAM) 604. In the RAM 604, various programs and data required for the operation of the apparatus 600 are further stored. The CPU 601, GPU 602, ROM 603, and RAM 604 are connected to each other through a bus 605. An input/output (I/O) interface 606 is also connected to the bus 605.

The following components are connected to the I/O interface 606: an input section 607 including a keyboard, a mouse, etc.; an output section 608 including a liquid crystal display (LCD), a loudspeaker, etc.; a storage section 609 including a hard disk, etc.; and a communication section 610 including a network interface card such as a LAN card, a modem, etc. The communication section 610 performs communication processing via a network such as the Internet. A driver 611 may also be connected to the I/O interface 606 as needed. A detachable medium 612 such as a magnetic disk, an optical disk, a magneto-optical disk, a semiconductor memory, and the like is installed on the drive 611 as needed, so that computer programs read therefrom is installed into the storage section 609 as needed.

In particular, according to an embodiment of the present disclosure, the process described above with reference to the flow chart can be implemented as a computer software program. For example, an embodiment of the present disclosure comprises a computer program product, which comprises a computer program carried on a computer-readable medium, and the computer program contains program codes for executing the method illustrated in the flow chart. In such an embodiment, the computer program may be downloaded and installed from the network through the communication section 610, and/or installed from the detachable medium 612. When the computer program is being executed by the central processing unit (CPU) 601 and the graphics processing unit (GPU) 602, the above-mentioned functions defined in the method of the present application are executed.

It is to be noted that the computer-readable medium described in the present application may be a computer-readable signal medium or a computer-readable medium, or any combination thereof. The computer-readable medium may be, for example, but not limited to, an electrical, magnetic, optical, electromagnetic, infrared or semiconductor device, device or apparatus, or any combination thereof. More specific examples of the computer-readable medium may include, but are not limited to: electrical connections with one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present application, the computer-readable medium may be any tangible medium that contains or stores a program, and the program may be used by or in combination with an instruction execution device, device or apparatus. In the present application, a computer-readable signal medium may include a data signal propagated in a baseband or as a part of a carrier wave, and a computer-readable program code is carried therein. This propagated data signal may take many forms, including but not limited to an electromagnetic signal, an optical signal, or any suitable combination thereof. The computer-readable signal medium may also be any computer-readable medium other than the computer-readable medium, and the computer-readable medium may send, propagate or transmit a program for use by or in combination with an instruction execution device, device or apparatus. The program code contained in the computer-readable medium can be transmitted by any suitable medium, including but not limited to: wireless, wire, optical cable, RF, etc., or any suitable combination thereof.

The computer program code used to perform operations of the present application can be written in one or more programming languages or a combination thereof. The programming languages include object-oriented programming languages—such as Java, Smalltalk, C++, and also conventional procedural programming language-such as "C" language or similar programming languages. The program code can be executed entirely on the user's computer, partly on the user's computer, executed as an independent software package, executed partly on the user's computer and partly on a remote computer, or entirely executed on a remote computer or server. In the case of a remote computer, the remote computer can be connected to the user's computer through any type of network, including a local area network (LAN) or a wide area network (WAN), or it can be connected to an external computer (for example, passing through the Internet connection using an Internet service provider).

The flow charts and block diagrams in the accompanying drawings illustrate the architectures, functions and operations that may be implemented by the devices, methods and computer program products according to various embodiments of the present application. In this regard, each block in the flow chart or block diagram may represent a module, program segment, or part of code, and the module, program segment, or part of code contains one or more executable instructions for realizing specified logic functions. It is also to be noted that, in some alternative implementations, the functions marked in the blocks may also take place in a different sequence from the sequence marked in the drawings. For example, two blocks shown in succession can actually be executed substantially in parallel, and they can sometimes be executed in a reverse order, depending on the functions involved. It is also to be noted that each block in a block diagram and/or flow chart, and a combination of blocks in a block diagram and/or flow chart may be implemented by a dedicated hardware-based device that performs a specified function or operation, or may be implemented by a combination of dedicated hardware and computer instructions.

The modules described in the embodiments of the present application can be implemented in software or hardware. The described modules can also be disposed in a processor.

The contents described above are only preferred embodiments of the present application and explanations to the applied technical principles. Those skilled in the art should understand that the scope of application involved in the present application is not limited to the technical solutions formed by specific combinations of the above technical features, and should also encompass other technical solutions formed by arbitrarily combining the above technical features or equivalent features thereof without departing from the concept of the present application, for example, technical solutions formed by replacing the above technical features with technical features with similar functions as those disclosed by (but not limited to) the present application.

The invention claimed is:

1. A method for restoring and reconstructing a spectrum of a light source based on a hyperspectral image, comprising the following steps:

S1: obtaining a hyperspectral image, denoted as I(x,y,ω), where x, y and ω represent a width, a height and a wavelength of the hyperspectral image, respectively, and performing Gaussian convolution processing on the hyperspectral image I(x,y,ω) to obtain a Gaussian blurred image B(x,y,ω): B(x,y,ω)=I(x,y,ω)*g(x,y), where g(x,y) is a Gaussian convolution kernel matrix;

S2: subtracting the Gaussian blurred image B(x,y,ω) from the hyperspectral image I(x,y,ω) to obtain an enhanced image E(x,y,ω): E(x,y, ω)=I(x,y,ω)−B(x,y,ω);

S3: obtaining a maximum value of each waveband in the enhanced image E(x,y,ω), and obtaining a first maximum spectrum R(ω) after visual enhancement: R(ω) =max$_{x,y}$(E(x,y,ω)), where max$_{x,y}$(E(x,y,ω)) represents seeking a maximum value of E(x,y,ω) in x and y dimensions;

S4: performing searching and matching of the first maximum spectrum R(ω) with a light source spectral basis vector set D(n,m,ω) in a pre-stored light source spectrum dictionary, and performing linear regression-based decomposition and merging to obtain a potential light source spectral vector set P(k,ω), where n is a vector sequence number of each basis vector in the light source spectral basis vector set D(n,m,ω) in the light source spectrum dictionary, m is a group number of interconnected vector group of each basis vector in the light source spectral basis vector set D(n,m,ω) in the light source spectrum dictionary, which interconnected vertor group is composed of interconnected basis vectors, and k is a vector sequence number of each basis vector in the potential light source spectral vector set P(k,ω) after said matching and merging in the light source spectrum dictionary;

S5: projecting the first maximum spectrum R(ω) to the potential light source spectral vector set P(k,ω) to obtain an intensity vector b(k) of each basis vector, and obtaining an initially predicted light source spectrum L$_0$(ω) according to the following formula: L$_0$(ω)=P(k, ω)*b(k), taking maximum values of both L$_0$(ω) and R(ω) in each waveband to obtain a second maximum spectrum R'(ω);

S6: replacing the first maximum spectrum R(ω) with the second maximum spectrum R'(ω), and repeating step S5 until a color temperature variation value of the second maximum spectrum R'(ω) is less than a predetermined threshold; and S7: normalizing a newly obtained initially predicted light source spectrum L$_0$(ω) to obtain a restored and reconstructed light source spectrum L(ω).

2. The method for restoring and reconstructing a light source spectrum based on a hyperspectral image according to claim 1, wherein, a step of establishing the light source spectrum dictionary specifically comprises:

S8: obtaining common light source spectral information, extracting waveform vectors having the same waveband range and waveband interval from the light source spectral information so as to form a first waveform vector set;

S9: separating and extracting each complete peak and valley information in a waveform of a light source with an unfixed spectrum or color temperature, extracting waveform vectors having the same waveband range and waveband interval from the peak and valley information, so as to form a second waveform vector set; and S10: marking and indexing each waveform vector of the same light source in the first waveform vector set and the second waveform vector set as an interconnected basis vector sequence to form a light source spectrum dictionary, the light source spectrum dictionary being composed of the light source spectral basis vector set D(n,m,ω).

3. The method for restoring and reconstructing a light source spectrum based on a hyperspectral image according to claim 2, wherein, in the step S9, a multi-Gaussian peak fitting method is used to separate and extract each complete peak and valley information in a waveform of a light source with an unfixed spectrum or color temperature.

4. The method for restoring and reconstructing a light source spectrum based on a hyperspectral image according to claim 2, wherein, the step S4 specifically comprises:

S41: performing linear regression of the first maximum spectrum R(ω) on the light source spectral basis vector set D(n, m, ω) in the light source spectrum dictionary, and combinating and forming a new light source spectral basis vector set D'(k',m',ω) according to a correlation, where k' is a vector sequence number of the new light source spectral basis vector set D'(k',m',ω) in the light source spectral dictionary, m' is a group number of interconnected vector group of the new light source spectral basis vector set D'(k',m',ω) in the light source spectrum dictionary;

S42: merging all other basis vectors having the same group number as m' in the light source spectrum dictionary into the new light source spectral basis vector set D'(k',m',ω) to obtain the potential light source spectral vector set P(k,ω), where k is a vector sequence number of each basis vector in the potential light source spectral vector set P(k,ω) in the light source spectrum dictionary.

5. The method for restoring and reconstructing a light source spectrum based on a hyperspectral image according to claim 4, wherein, basis vectors that are arranged from high to low in order of correlation and taken from the top of the new light source spectral basis vector set D' (k',m',ω) contain no more than two or three light source components.

6. The method for restoring and reconstructing a light source spectrum based on a hyperspectral image according to claim 1, wherein, the linear regression-based decomposition comprises least square linear regression-based decomposition.

7. The method for restoring and reconstructing a light source spectrum based on a hyperspectral image according to claim 1, wherein, a formula of a two-dimensional Gaussian kernel used by the Gaussian convolution processing is:

$$g(x, y) = \frac{1}{2\pi\sigma^2}e^{-(x^2+y^2)/2\sigma^2}$$

where σ is a standard deviation of a Gaussian function.

8. The method for restoring and reconstructing a light source spectrum based on a hyperspectral image according to claim 7, wherein, the g(x, y) is replaced by an i×i digital matrix.

9. The method for restoring and reconstructing a light source spectrum based on a hyperspectral image according to claim 1, wherein, a color temperature variation value $\Delta T_c$ of the second maximum spectrum R'(ω) is calculated according to the following formula: $\Delta T_c = |T_c(L_0) - T_c(R')|$, where $T_c(L_0)$ is a color temperature to which the initially predicted light source spectrum $L_0(\omega)$ corresponds, $T_c(R')$ is a color temperature of the second maximum spectrum R'(ω).

10. A computing device for restoring and reconstructing a light source spectrum based on a hyperspectral image, comprising a memory and a processor, wherein the processor executes the following steps:

obtaining a hyperspectral image, denoted as I(x,y,ω), where x, y and ω represent a width, a height and a wavelength of the hyperspectral image, respectively, and performing Gaussian convolution processing on the hyperspectral image I(x,y,ω) to obtain a Gaussian blurred image B(x,y,ω): B(x,y,ω)=I(x,y,ω)*g(x,y), where g(x,y) is a Gaussian convolution kernel matrix;

subtracting the Gaussian blurred image B(x,y,ω) from the hyperspectral image I(x,y,ω) to obtain an enhanced image E(x,y,ω): E(x,y,ω)=I(x,y,ω)−B(x,y,ω);

obtaining a maximum value of each waveband in the enhanced image E(x,y,ω) to obtain a first maximum spectrum R(ω) after visual enhancement: R(ω)=$\max_{x,y}$(E(x,y,ω)), where $\max_{x,y}$(E(x,y,ω)) represents seeking a maximum value of E(x,y,ω) in x and y dimensions;

performing searching and matching of the first maximum spectrum R(ω) with a light source spectral basis vector set D(n,m,ω) in a pre-stored light source spectrum dictionary, and performing linear regression-based decomposition and merging to obtain a potential light source spectral vector set P(k,ω), where n is a vector sequence number of each basis vector in the light source spectral basis vector set D(n,m,ω) in the light source spectrum dictionary, m is a group number of interconnected vector group of each basis vector in the light source spectral basis vector set D(n,m,ω) in the light source spectrum dictionary, which interconnected vector group is composed of interconnected basis vectors, and k is a vector sequence number of each basis vector in the potential light source spectral vector set P(k,ω) after said matching and merging in the light source spectrum dictionary;

projecting the first maximum spectrum R(ω) to the potential light source spectral vector set P(k,ω) to obtain an intensity vector b(k) of each basis vector, and obtaining an initially predicted light source spectrum $L_0(\omega)$ according to the following formula: $L_0(\omega)=P(k,\omega)*b(k)$, taking maximum values of both $L_0(\omega)$ and R(ω) in each waveband to obtain a maximum spectrum R'(ω);

replacing the first maximum spectrum R(ω) with the second maximum spectrum R'(ω), and repeatedly executing the light source spectrum initial prediction module until a color temperature variation value of the second maximum spectrum R'(ω) is less than a predetermined threshold; and normalizing a newly obtained initially predicted light source spectrum $L_0(\omega)$ to obtain a restored and reconstructed light source spectrum L(ω).

11. A computer readable storage medium with a computer program stored thereon, wherein, the method according to claim 1 is carried out when the program is executed by a processor.

12. A computer readable storage medium with a computer program stored thereon, wherein, the method according to claim 2 is carried out when the program is executed by a processor.

13. A computer readable storage medium with a computer program stored thereon, wherein, the method according to claim 3 is carried out when the program is executed by a processor.

14. A computer readable storage medium with a computer program stored thereon, wherein, the method according to claim 4 is carried out when the program is executed by a processor.

15. A computer readable storage medium with a computer program stored thereon, wherein, the method according to claim 5 is carried out when the program is executed by a processor.

16. A computer readable storage medium with a computer program stored thereon, wherein, the method according to claim 6 is carried out when the program is executed by a processor.

17. A computer readable storage medium with a computer program stored thereon, wherein, the method according to claim 7 is carried out when the program is executed by a processor.

18. A computer readable storage medium with a computer program stored thereon, wherein, the method according to claim 8 is carried out when the program is executed by a processor.

19. A computer readable storage medium with a computer program stored thereon, wherein, the method according to claim 9 is carried out when the program is executed by a processor.

* * * * *